United States Patent [19]

Rajamani et al.

[11] Patent Number: 5,796,724
[45] Date of Patent: Aug. 18, 1998

[54] METHOD AND APPARATUS FOR PARTITIONING TRANSMISSION BANDWIDTH AMONG DIFFERENT DATA STREAMS

[75] Inventors: Krishnan Rajamani; Krishnaswamy Viswanathan, both of Portland, Oreg.

[73] Assignee: Intel Corporation, Santa Clara, Calif.

[21] Appl. No.: 580,190

[22] Filed: Dec. 28, 1995

[51] Int. Cl.$^6$ ............................................. H04J 3/16
[52] U.S. Cl. .......................... 370/263; 370/468; 348/17
[58] Field of Search ........................ 370/263, 468; 348/17

[56] References Cited

U.S. PATENT DOCUMENTS 5,392,223  2/1995  Caci ............................................. 364/514

*Primary Examiner*—Melvin Marcelo
*Attorney, Agent, or Firm*—Blakely, Sokoloff, Taylor & Zafman

[57] ABSTRACT

A communications system having a first data subsystem; a data transmission controller coupled to the first data subsystem; a data line coupled to the data transmission controller having a bandwidth with a first portion and a second portion; and, a second data subsystem coupled to the data transmission controller. A method for dynamically estimating and allocating the bandwidth between the first data subsystem and the second data subsystem having the steps of measuring a utilization level of the first portion of the bandwidth by a first application; detecting whether the utilization level is outside of a predetermined range; and, changing an allocation of the first portion and the second portion of the bandwidth.

16 Claims, 3 Drawing Sheets

5,796,724

METHOD AND APPARATUS FOR PARTITIONING TRANSMISSION BANDWIDTH AMONG DIFFERENT DATA STREAMS

BACKGROUND OF THE INVENTION

1. Field of the Invention

The present invention relates to the field of use of multimedia conferencing. More particularly, the present invention relates to providing a method and apparatus for achieving optimal use of transmission bandwidth in the transmission of different data types.

2. Description of Related Art

Video conferencing systems often have to support the transmission of different data types, including audio data, video data, and application data. During normal operations, audio and video data are constantly transmitted. However, other data such as application data may be transmitted sporadically, depending on the needs of the application or of the users of the video conferencing systems. For example, a participant of a video conferencing session may wish to transfer a file to another participant during the session. Thus, the video conferencing system must transmit the data of this file in addition to the audio and video data.

Currently, in video conferencing systems that follow the H.320/T.120 standards of the International Telecommunication Union (ITU), the total transmission bandwidth is partitioned among the audio, video and multi-layer protocol (MLP) data streams. The use of the H.221 standard of the ITU allows an end point to dynamically alter the bandwidth allocated to each type of data stream. For example, one allocation scheme is one where the audio data stream is assigned a fixed portion of the total available bandwidth, with the remaining bandwidth being dynamically partitioned between the video and MLP data streams. In this scheme, MLP data is given priority over video data.

Although the framework defined by the H.221 standard allows dynamic partitioning of the bandwidth among the different streams of data during a session, no mechanism is provided for deciding the actual allocation of the bandwidth among the three types of data streams. In addition, no mechanism is provided for determining when the allocation needs to be changed, nor is there a mechanism to automatically determine how the allocation is to be made.

SUMMARY OF THE INVENTION

In order to provide for a determination of (1) the actual allocation of the bandwidth to the multi-layer protocol (MLP) data; (2) when the allocation needs to be changed; and (3) how the allocation is to be made, an estimation must be dynamically made of the MLP rate needed to transmit the MLP data generated by a high-level data-link control (HDLC) data application. This estimation can then be the basis for varying the non-audio bandwidth partitioning between the video and MLP data streams in a conference following the H.320 model.

Also, efficient allocation can be made of the non-audio bandwidth by obtaining the value of the MLP occupancy ratio, which is the portion of the bandwidth used by the HDLC data application, and adjusting the bandwidth assigned for transmission of the MLP data stream accordingly. The MLP occupancy ratio can be tracked by the H.221 layer as a recent average, since the H.221 layer injects IDLE flags, which represent idle/silence data between two valid data frames, to fill up the unoccupied MLP bandwidth. Specifically, the IDLE flags are used to fill-up the unused portion of the MLP data stream when there is not enough MLP data to fill up the MLP data stream so that all frames that are transmitted are of one size. As it is assumed that the video and audio encoders will fill up the video and audio streams, respectively, with real data, only MLP data need to be supplemented to ensure that the bandwidth allocated to transmitting the MLP data stream is filled with real data. Thus, the IDLE flags are used to ensure that the allocated MLP data stream is always filled to capacity by MLP data supplemented by the IDLE flags.

In the preferred embodiment, the H.221 subsystem will either: (1) raise MLP rate whenever the MLP channel is fully occupied and there is sufficient data queued for transmission; or (2) lower it whenever it is sparsely occupied and there is not enough data queued for transmission.

The H.221 subsystem of a preferred embodiment of the current invention makes the estimation of independent of the actual application. H.221 subsystem operates automatically and does not need the intervention of the user or application program.

The H.221 subsystem also automatically throttles the Video encoder based on the activity level of the MLP application. Thus, the H.221 subsystem will control the video encoder such that the video encoder will provide more video or less video data to be transmitted over a period of time depending on how much bandwidth is left after the bandwidth for MLP data has been assigned. The operation of the video encoder in response to the control signal of the H.221 subsystem to either encode video information at a higher/lower frame rate or more/less data per frame is well known in the art.

Other objects, features and advantages of the present invention will be apparent from the accompanying drawings, and from the detailed description that follows below.

DETAILED DESCRIPTION OF THE INVENTION

The present invention provides a method and apparatus for achieving optimal use of transmission bandwidth in the transmission of different data types. For purposes of explanation, specific embodiments are set forth to provide a thorough understanding of the present invention. However, it will be understood by one skilled in the art, from reading this disclosure, that the invention may be practiced without these details. Further, although the present invention is described through the use of a communications system which conforms to the H.221 standard of the International Telecommunication Union which defines frame structures for a 64 to 1920 kbit/s channel in audiovisual teleservices, most, if not all, aspects of the invention apply to communications systems in general. Moreover, well-known elements, devices, process steps and the like are not set forth in detail in order to avoid obscuring the present invention.

Figure 1:
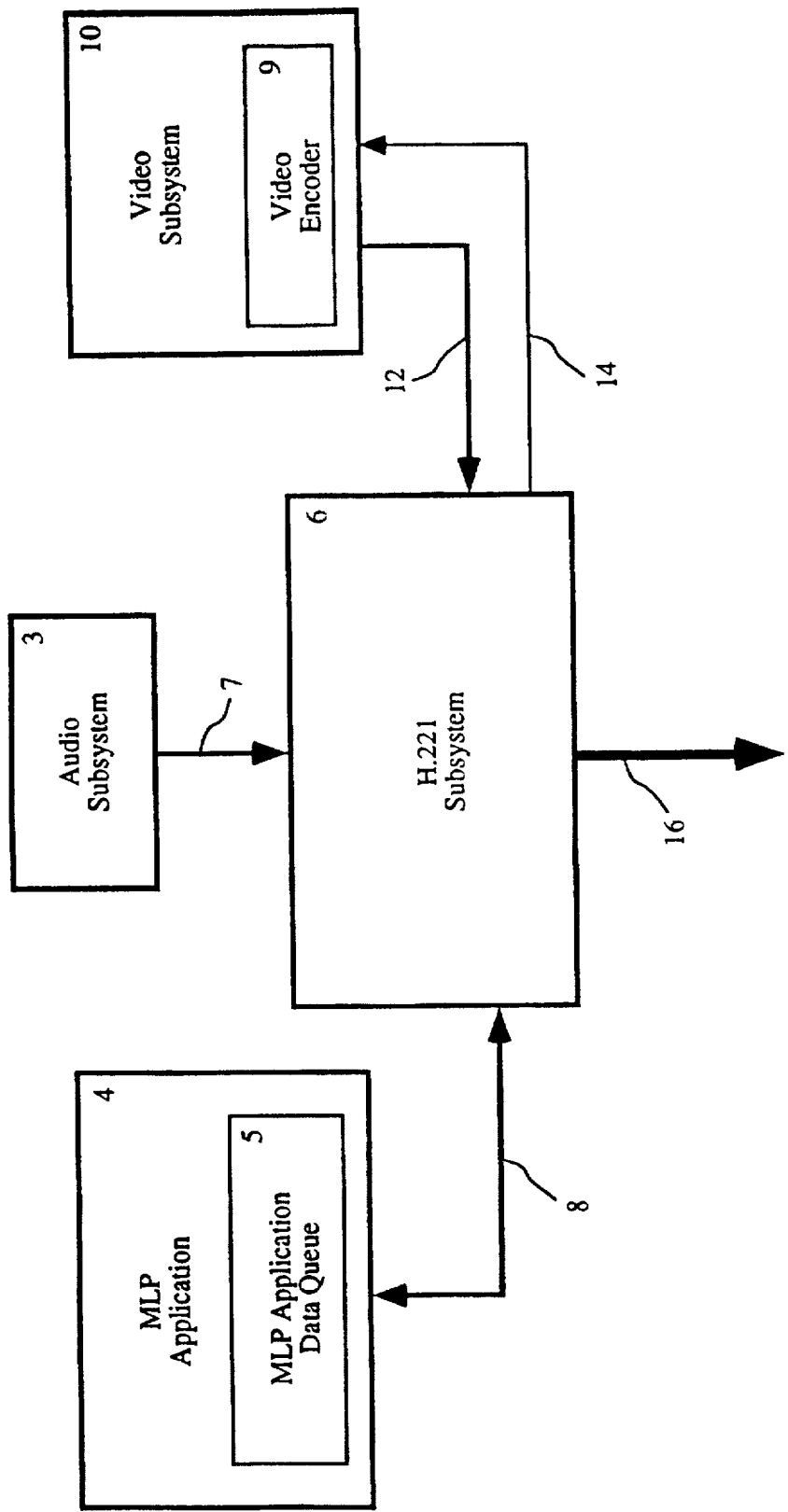
FIG. 1 illustrates a communication system configured in a preferred embodiment of the invention wherein a H.221 subsystem is coupled to a multi-layer protocol (MLP) application, a video subsystem and an audio subsystem.

FIG. 1 illustrates a communications system 2 configured in a preferred embodiment of the invention. In communications system 2, MLP application 4 generates data during normal operations and stores it into a MLP application data queue 5. The data contained in MLP application data queue 5 is then transferred to an H.221 subsystem 6 through data bus 8. H.221 subsystem 6 also receives video data to be transmitted from a video subsystem 10 through the use of video data line 12. The video data is encoded by a video encoder 9 of video subsystem 10 at a rate which could be changed by H.221 subsystem 6 sending control signals over video rate control line 14. In addition, H.221 subsystem 6 receives audio data from an audio subsystem 3 over an audio data line 7 for transmission.

After H.221 subsystem 6 receives MLP data from MLP data line 8, video data from video data line 12 and audio data from audio data line 7, H.221 subsystem 6 transmits it in accordance to the H.221 standard on output line 16. Audio data received by H.221 subsystem 6 from audio subsystem 3 is, in a preferred embodiment of the invention, sent at a pre-determined and fixed rate over output line 16. However, the data rates generated by MLP application 4 and video subsystem 10 can be variable and at certain times the combined generated data rate to be sent can exceed the bandwidth available for transmitting non-audio data. Thus, as the bandwidth of output line 16 is limited, an allocation of the non-audio data bandwidth must be made between MLP data and video data.

In a preferred embodiment, the bandwidth allocated to the audio data stream is fixed and is never changed while allocation between the MLP data stream and the video data stream occurs according to the needs of MLP application 4. Thus, the MLP data stream is given precedent over the video data stream in the allocation of bandwidth. The bandwidth allocated to the MLP data stream is increased or decreased according to the operations of a flow diagram contained in FIG. 3, below. The remaining bandwidth, minus the portion of the bandwidth that is allocated to the audio data stream, remains for the transmission of video data. As precedence is given to the transmission of MLP data in the allocation of available bandwidth, if it is determined that the bandwidth currently allocated to the transmission of MLP data is insufficient to maintain a minimum latency time, then more bandwidth will be allocated to the MLP data stream and, accordingly, less bandwidth will be allocated to the video data stream. Thus, the focus is to reduce the latency time in the transmission of MLP data from MLP application 4.

In a preferred embodiment, both (a) MLP_UTILIZATION, which is the percentage of MLP bandwidth used for transmitting real data over a determined number of Sub-Multi Frames (SMFs); and (b) QUEUE_SIZE, which is the amount of MLP data queued up for transmission; are monitored. MLP_UTILIZATION is monitored to determine whether an MLP rate change is required and, if a rate change is required, QUEUE_SIZE is used to determine the next MLP rate.

The parameters contained in Table 1, below, are used to determine when and how the MLP rate is to be changed.

TABLE 1

PARAMETERS USED FOR MLP RATE DETERMINATION

| PARAMETER | DESCRIPTION |
| --- | --- |
| N | Number of sub-multi frames (SMFs) over which the MLP occupancy ratio will be sampled. |
| LOWER_MLP_THRESHOLD | Threshold value for MLP_UTILIZATION, which triggers a switch to lower MLP rate. |
| HIGHER_MLP_THRESHOLD | Threshold value for MLP_UTILIZATION, which triggers a switch to higher MLP rate. |
| MIN_DURATION | Minimum duration for which an MLP rate must be maintained. |
| CURRENT_RATE | The current MLP rate. |
| NEW_RATE | The new MLP rate after the rate change. |
| Q_DRAIN_TIME | Desired minimum time in which the entire data queued is to be transmitted out at the new rate. |
| ACCEPTABLE_TRANSFER_RATE | The transfer rate which allows the entire data queue to be transmitted in Q_DRAIN_TIME. |

Once it is determined that a change in the MLP rate is required, NEW_RATE, which is the new MLP rate, has to be determined. This is based on the queue size. The new rate is so chosen that the entire queued data can be drained within Q_DRAIN_TIME. NEW_RATE is rounded up to the nearest permissible MLP rate allowed by H.221, as shown in Table 2, below.

Figure 2:
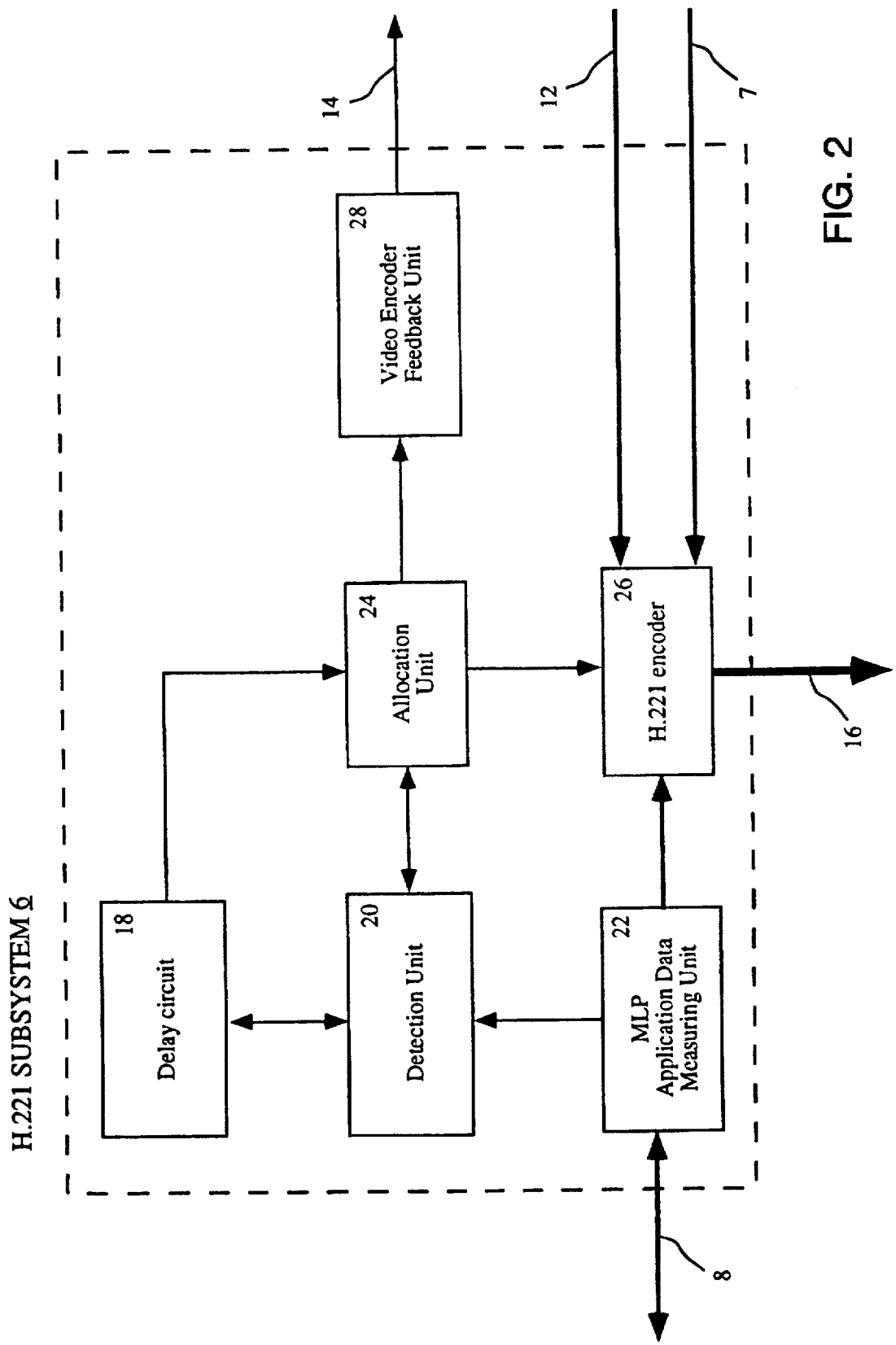
FIG. 2 illustrates a preferred embodiment of the H.221 subsystem configured to dynamically estimate and adjust an allocation of bandwidth between the MLP application and the video subsystem.

FIG. 2 illustrates a preferred embodiment of H.221 subsystem 6 configured for the dynamic allocation of the non-audio bandwidth of output line 16. H.221 subsystem 6 includes a delay circuit 18, a detection unit 20, a MLP application data measuring unit 22, an allocation unit 24, a H.221 encoder 26, and a video encoder feedback unit 28.

Delay circuit 18 is coupled to allocation unit 24 and is configured to control the operation of allocation unit 24. Allocation unit 24 functions to change the non-audio bandwidth allocation of output line 16 and is allowed to operate only during certain periods. As will be described below, allocation unit 24 is also only allowed to change the bandwidth allocation of output line 16 only if detection unit 20 signals that a threshold limit has been breached. Thus, operation of allocation unit 24 depends on signals from delay circuit 18 and detection unit 20.

Detection unit 20 is coupled to allocation unit 24 and is configured to detect when the MLP portion of the current bandwidth allocation of output line 16 is not at an efficient allocation. Detection unit 20 is coupled to MLP application data measuring unit 22 to receive the value of MLP_UTILIZATION during normal operations.

MLP application data measuring unit 22 injects the IDLE flags for filling the portion of the MLP data stream that is unfilled by MLP application 4. As defined by the HDLC standards, IDLE flags are the bit pattern "01111110," which is six "1"'s proceeded and followed by a "0". This octet pattern can occur anywhere in the bit stream. In addition, MLP application data measuring unit 22 is responsible for determining the value of MLP_UTILIZATION to send to detection unit 20. Thus, MLP application data measuring unit 22 adds additional bits to the data received from MLP Application 4 through MLP data line 8 for H.221 encoder 26 to process for transmission. In an alternate embodiment, MLP application 4 would be responsible for injecting the IDLE flags to the MLP data stream before it is sent to MLP application data measuring unit 22 of H.221 subsystem 6. Also, MLP application data measuring unit 22 would not interfere with the data flow received from MLP Application 4 through MLP data line 8 but, instead, forward the data unchanged to H.221 encoder 26. Thus, MLP application data measuring unit 22 would operate transparently to H.221 encoder 26 and MLP application 4.

Allocation unit 24 is responsible for determining the new non-audio bandwidth allocation of output line 16 and providing that determination to H.221 encoder 26. Allocation unit 24 is also coupled to video encoder feedback unit 28 so that the video rate generated by video encoder 9 can be throttled, or changed, as determined by allocation unit 24.

H.221 encoder 26, which receives the modified MLP data stream containing MLP data and IDLE flags from MLP allocation data measuring unit 22, the video data stream containing video data from video subsystem 10, and the audio data stream containing audio data from audio subsystem 3, is responsible for transmitting the data out using output line 16 in a format conforming to the H.221 frame structure standard.

Figure 3:
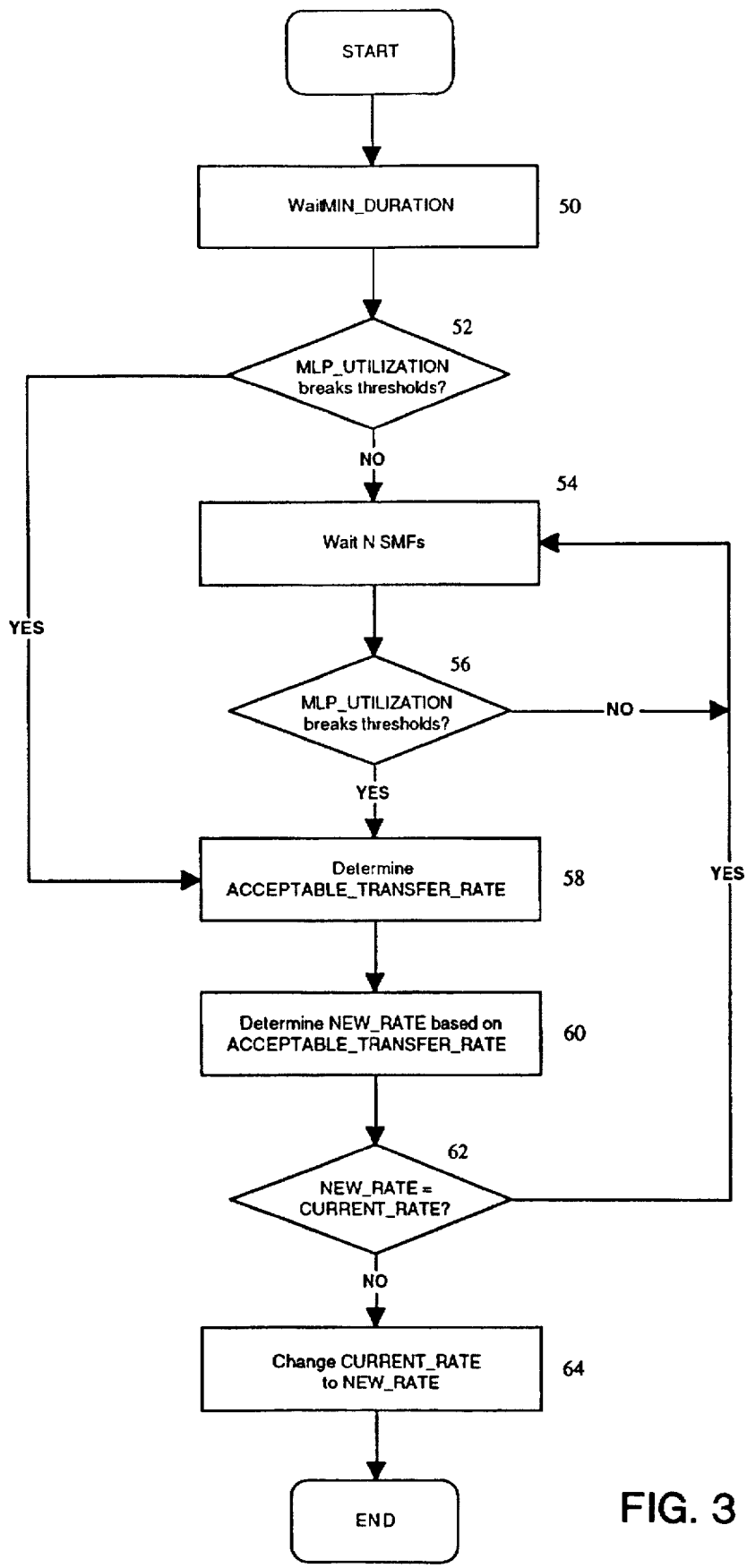
FIG. 3 illustrates a flow diagram of the operation of a preferred embodiment of the invention wherein an allocation of bandwidth is made between the MLP application and the video subsystem.

FIG. 3 is a flow diagram of the operation of a preferred embodiment of the invention. In block 50, when H.221 subsystem 6 begins operation, delay circuit 18 will prevent allocation unit 24 from changing the allocation of the bandwidth of output line 16 for a period of MIN_DURATION. The value of MIN_DURATION in block 50 is constrained by the response time of video subsystem 10, which in this preferred embodiment requires a minimum of 2 seconds before the rate of encoding of video encoder 9 can be changed by video encoder feedback unit 28 using video rate control line 14. Thus, the value of MIN_DURATION in is the minis the minimum duration for which an MLP rate must be maintained before video subsystem 10 can adopt to a new MLP rate. The video encoder also throttles operation depending on how much video-data is queued up. If the video rate changes too often, then there would be too much data queued up which can lead to unnecessary throttling. As noted, in other embodiments, the value of MIN_DURATION can be either longer or shorter depending on the implementation of video encoder 9.

In block 52, after a time of MIN_DURATION, detection unit 20 is used to determine if MLP_UTILIZATION, which is the percentage of the MLP bandwidth that is occupied by real data and not filled with idle flags over MIN_DURATION, is either: (1) less than LOWER_MLP_THRESHOLD_, which is a threshold value for triggering a switch to a lower MLP rate; or (2) higher than HIGHER_MLP_THRESHOLD, which represents a threshold value for triggering a switch to a higher MLP rate. In situation (1), above, if MLP_UTILIZATION is less than LOWER_MLP_THRESHOLD_, the MLP bandwidth (i.e., the bandwidth assigned to the MLP data stream) is under-utilized whereby an unacceptable amount of the MLP bandwidth is left unused, then the partitioning of the total data bandwidth has to be adjusted so that the wasted MLP bandwidth can be used for transmitting video data. Similarly, in situation (2), above, if MLP_UTILIZATION is greater than HIGHER_MLP_THRESHOLD, then all or almost all, of the MLP bandwidth is being utilized and therefore the portion of the total bandwidth of the system which is allocated for transmitting the MLP data stream must be increased.

The values assigned to HIGHER_MLP_THRESHOLD and LOWER_MLP_THRESHOLD determines how "responsive" H.221 subsystem 6 is to the utilization of the MLP bandwidth by MLP application 4. For example, if it is desired that H.221 subsystem 6 should be very responsive to maintaining a more than adequate MLP bandwidth for transferring MLP application 4, then HIGHER_MLP_THRESHOLD would be set to be a lower value so that a lower value of MLP_UTILIZATION would signal a switch to a higher allocation of bandwidth for transmitting MLP data. If it is desired that H.221 subsystem 6 should be responsive to any wasted MLP bandwidth, then LOWER_MLP_THRESHOLD would be set to a higher value.

In a preferred embodiment, LOWER_MLP_THRESHOLD is set at 70%, while HIGHER_MLP_THRESHOLD is set at 80%. However, it is noted that either threshold can be changed as desired in alternative embodiments. For example, the threshold levels may be changed as dependent on the current MLP rate such that as CURRENT_RATE increases or decreases, the value of HIGHER_MLP_THRESHOLD would be decreased or increased, respectively. Similarly, as CURRENT_RATE increases or decreases, the value of LOWER_MLP_THRESHOLD would also be increased or increased or decresed, respectively.

If the value of MLP_UTILIZATION does break either threshold, operation will continue with block 58, as described below. However, if MLP_UTILIZATION does not break either threshold, then operation will continue with block 54. In block 54, delay circuit 18 will prevent the changing of the bandwidth allocation of output line 16 by allocation unit 24 for a period of N SMFs. During this time, MLP application data measuring unit 22 will collect data to determine the total number of idle flags, if any, injected by MLP application data measuring unit 22 into the bandwidth allocated for MLP data and thus determine the percentage of MLP bandwidth that is being utilized to transmit data from MLP application data queue 5 of MLP application 4. Thus, the value of MLP_UTILIZATION will be cleared and a new value determined every time block 54 is encountered. In an alternate embodiment, the value of MLP_UTILIZATION does not have to be reset every time block 54 is encountered with the result that the value of MLP_UTILIZATION would represent the utilization of the bandwidth assigned to transmitting MLP data over a longer period of time. In a preferred embodiment, N is 12, which means that in block 54, H.221 subsystem 6 will wait for 12 SMFs. The time to transmit 12 SMFs is 240 ms as it requires 20 ms to transmit a single sub-multiframe. After N SMFs, execution will then continue with block 56.

In block 56, detection unit 20 will again determine if the value of MLP_UTILIZATION is either (1) greater than HIGHER_MLP_THRESHOLD; or (2) lower than LOWER_MLP_THRESHOLD. The value of MLP_UTILIZATION in block 56, unlike the value of MLP_UTILIZATION in block 52, is measured over the N SMFs as described in regards to the operation of block 54, above. If detection unit 20 signals that MLP_UTILIZATION does not break either threshold, then operation will return to and continue with block 54—i.e., H.221 subsystem 6 will again wait N SMFs and collect data to determine a new value for MLP_UTILIZATION, which is the percentage of MLP bandwidth that is not injected with idle flags over that period. If, however, detection unit 20 signals that MLP_UTILIZATION breaks either threshold, operation will continue with block 58.

In block 58, once detection unit 20 has been determined that MLP_UTILIZATION has broken a threshold—i.e., CURRENT_RATE, the current MLP transfer rate, is either too high or too low—allocation unit 24 of H.221 subsystem 6 must determine ACCEPTABLE_TRANSFER_RATE, which is the acceptable transfer rate based on the formula:

$$\text{ACCEPTABLE\_TRANSFER\_RATE} = \frac{\text{DATA\_Q\_SIZE}}{\text{Q\_DRAIN\_TIME}} \quad (1)$$

wherein DATA_Q_SIZE is the current size of MLP application data queue 5 of MLP application 4, and Q_DRAIN_TIME is the preferred minimum latency time within which the data contained in MLP application data queue 5 will most preferably be transmitted. The value of Q_DRAIN_TIME is determined by the specific implementation. In a preferred embodiment, Q_DRAIN_TIME has a value of 250 ms.

Continuing with block 60, allocation unit 24 will also determine NEW_RATE, which is a new MLP transfer rate based upon the value determined for ACCEPTABLE_TRANSFER_RATE and the discrete values allowed for the MLP rate as set forth in Table 2, below.

TABLE 2

Possible Discrete Values for NEW_RATE

| ACCEPTABLE_TRANS-FER_RATE (kbit/s) | | Possible H.221 Setting | Resulting NEW_RATE (kbit/s) |
|---|---|---|---|
| > | <= | | |
| 0 | 4.0 | MLP-4 | 4.0 |
| 4.0 | 6.4 | MLP-6.4 | 6.4 |
| 6.4 | 8.0 | MLP-8 | 8.0 |
| 8.0 | 14.4 | MLP-14.4 | 14.4 |
| 14.4 | 16.0 | MLP-16 | 16.0 |
| 16.0 | 22.4 | MLP-22.4 | 22.4 |
| 22.4 | 24.0 | MLP-24 | 24.0 |
| 24.0 | 30.4 | MLP-30.4 | 30.4 |
| 30.4 | 32.0 | MLP-32 | 32.0 |
| 32.0 | 38.4 | MLP-38.4 | 38.4 |
| 38.4 | 40.0 | MLP-40 | 40.0 |
| 40.0 | 46.4 | MLP-46.4 | 46.4 |
| 46.4 | 62.4 | MLP-62.4 | 62.4 |
| 62.4 | 64.0 | MLP-64 | 64.0 |

In block 62, if the NEW_RATE determined in block 60 by allocation unit 24—based on the value of ACCEPTABLE_TRANSFER_RATE and Table 2, above—is equal to CURRENT_RATE, then no change needs to be made to the current MLP rate and operation will continue by returning to block 54. Otherwise, if the discrete value of NEW_RATE is not equal to the discrete value of CURRENT_RATE, then operation will continue with block 64.

In block 64, CURRENT_RATE, the current MLP rate, is changed to NEW_RATE, which is the value calculated as described in block 60. This change is performed by allocation unit 24 signaling H.221 encoder 26 to adopt an allocation of bandwidth compatible with NEW_RATE. Allocation unit 24 also provides detection unit 20 of the value of NEW_RATE so that detection unit 20 can be updated as to the new value of CURRENT_RATE. In addition, allocation unit 24 will also notify video encoder feedback unit of the new allocation and video encoder feedback unit 28 will signal video encoder 9 through the use of video rate control line 14 to change the rate of encoding accordingly. After block 64 has executed, operation will cease. In an alternative embodiment, operations may return to block 50. Thus, the flow diagram shown in FIG. 3 can be traced through as many times as it is necessary until communications system 2 ceases to operate.

Although specific values for these parameters have been given above, these parameters may be tuned based on the individual communications system and the application of the communications system. A reasonable combination of the parameters (N, Q_DRAIN_TIME, HIGHER_MLP_THRESHOLD, LOWER_MLP_THRESHOLD, MIN_DURATION) is empirically determined based on the following metrics: (1) response time for switching to higher MLP rate when MLP applications demand it; (2) response time for switching to higher video rate when MLP applications are quiescent; and (3) reaction time of the video encoder.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method for dynamically estimating and allocating a bandwidth having a first portion and a second portion comprising the steps of:

measuring a utilization level of said first portion of said bandwidth by a first application by examining an amount of an unused portion of said first portion of said bandwidth;

detecting whether said utilization level is outside of a predetermined range and whether a predetermined amount of data generated by said first application has been queued for transmission; and, changing an allocation of said first portion and said second portion of said bandwidth based on said detecting step.

2. The method of claim 1, further comprising the step of waiting a predetermined period of time before executing said changing step.

3. The method of claim 1, further comprising the step of changing a second utilization level of said second portion of said bandwidth by a second application.

4. The method of claim 1, wherein:

said detecting step comprises the step of determining whether said utilization level is higher than said predetermined range; and said changing step comprises the step of changing said allocation of said first portion of said bandwidth to increase said first portion of said bandwidth.

5. The method of claim 1, wherein:

said detecting step comprises the step of determining whether said utilization level is lower than said predetermined range; and said changing step comprises the step of changing said allocation of said first portion of said bandwidth to decrease said first portion of said bandwidth.

6. The method of claim 1 wherein said changing step comprises the steps of:

determining a new allocation of said first portion and said second portion of said bandwidth; and changing said allocation to said new allocation.

7. A communications system comprising:

a first data subsystem;

a data transmission controller coupled to said first data subsystem and having:

a measuring unit coupled to said first data subsystem for measuring a utilization level of said first portion of said bandwidth by said first data subsystem by examining an amount of an unused portion of said first portion of said bandwidth;

a detection unit coupled to said measuring unit for detecting whether said utilization level is outside of a predetermined range and whether a predetermined amount of data generated by said first data subsystem has been queued for transmission; and, an allocation unit coupled to said detection unit for changing an allocation of said first portion of said bandwidth based on output of said detection unit;

a data line having a bandwidth coupled to said data transmission controller, said bandwidth having a first portion and a second portion; and a second data subsystem coupled to said data transmission controller.

8. The communications system of claim 7, wherein said data transmission controller further comprises a delay unit coupled to said detection unit and said allocation unit for waiting a predetermined period of time before allowing said allocation unit to operate.

9. The communications system of claim 7, wherein said data transmission controller further comprises a feedback unit coupled to said allocation unit and said second data subsystem for controlling a second utilization level of said second portion of said bandwidth by said second data subsystem.

10. The communications system of claim 7, wherein said data transmission controller further comprises an encoder unit coupled to said allocation unit, said measuring unit, said second data subsystem, and said data line for encoding any data received from said first data subsystem and said second data subsystem into a format suitable for transmission over said data line.

11. The communications system of claim 10, wherein said format suitable for transmission over said data line is the H.221 format.

12. A data transmission controller for dynamically estimating and allocating a bandwidth having a first portion and a second portion comprising:

a measuring unit coupled to said first data subsystem for measuring a utilization level of said first portion of said bandwidth by said first data subsystem by examining an amount of an unused portion of said first portion of said bandwidth;

a detection unit coupled to said measuring unit for detecting whether said utilization level is outside of a predetermined range and whether a predetermined amount of data generated by said first data subsystem has been queued for transmission; and, an allocation unit coupled to said detection unit for changing an allocation of said first portion of said second portion of bandwidth based on output of said detection unit.

13. The data transmission controller of claim 12, further comprising a delay unit coupled to said detection unit and said allocation unit for waiting a predetermined period of time before allowing said allocation unit to operate.

14. The data transmission controller of claim 12, further comprising a feedback unit coupled to said allocation unit for controlling a second utilization level of said second portion of said bandwidth by a second data subsystem.

15. The data transmission controller of claim 12, further comprising an encoder unit coupled to said allocation unit, said measuring unit, a second data subsystem, and said data line for encoding any data received from a first data subsystem and said second data subsystem into a format suitable for transmission over a data line.

16. The data transmission controller of claim 15, wherein said format suitable for transmission over said data line is the H.221 format.

\* \* \* \* \*